US012623425B2

(12) United States Patent
Gordon

(10) Patent No.: US 12,623,425 B2
(45) Date of Patent: May 12, 2026

(54) METHOD AND APPARATUS FOR MAKING A GAP FILLER HAVING A VARIABLE CROSS-SECTION

(71) Applicant: The Boeing Company, Arlington, VA (US)

(72) Inventor: Christian Gordon, Kingsville (AU)

(73) Assignee: The Boeing Company, Arlington, VA (US)

( * ) Notice: Subject to any disclaimer, the term of this patent is extended or adjusted under 35 U.S.C. 154(b) by 40 days.

(21) Appl. No.: 18/524,203

(22) Filed: Nov. 30, 2023

(65) Prior Publication Data

US 2025/0128481 A1 Apr. 24, 2025

Related U.S. Application Data

(60) Provisional application No. 63/591,530, filed on Oct. 19, 2023.

(51) Int. Cl.
*B29C 70/52* (2006.01)
*B29D 99/00* (2010.01)
*B29L 31/30* (2006.01)

(52) U.S. Cl.
CPC ........ *B29D 99/0005* (2021.05); *B29C 70/526* (2013.01); *B29C 70/528* (2013.01); *B29L 2031/3076* (2013.01)

(58) Field of Classification Search
CPC ... B29C 70/526; B29C 70/504; B29C 70/528; B29C 43/224; B29C 43/46; B29C 2043/461–468; B29C 48/12; B29C 48/13; B29L 2031/3076; B29D 99/0005; B29D 99/0007

USPC ........ 264/167, 284, 310; 425/366, 394, 465; 100/158 C, 158 R
See application file for complete search history.

(56) References Cited

U.S. PATENT DOCUMENTS

| | | | |
|---|---|---|---|
| 8,591,685 B2 * | 11/2013 | Anderson | B29C 70/52 |
| | | | 156/209 |
| 10,668,683 B2 | 6/2020 | Klimovski et al. | |
| 10,703,053 B2 | 7/2020 | Gordon | |
| 10,717,239 B2 | 7/2020 | Gordon et al. | |
| 11,065,830 B2 | 7/2021 | Klimovski et al. | |
| 2016/0121536 A1 * | 5/2016 | Derx | B29C 48/302 |
| | | | 425/329 |
| 2017/0239897 A1 * | 8/2017 | Rihei | B29C 70/504 |

* cited by examiner

*Primary Examiner* — John L Goff, II
(74) *Attorney, Agent, or Firm* — Yee & Associates, P.C.

(57) ABSTRACT

A forming die has a continuously configurable nip allowing a composite preform to be formed into continuous composite gap filler that has a variable cross-section along its length.

20 Claims, 12 Drawing Sheets

118 —

128

132 — SPECIFICATION AND DESIGN

134 — MATERIAL PROCUREMENT

136 — COMPONENT AND SUBASSEMBLY MANUFACTURING

138 — SYSTEM INTEGRATION

140 — CERTIFICATION AND DELIVERY

142 — IN SERVICE

144 — MAINTENANCE AND SERVICE

130

AIRCRAFT

146 — AIRFRAME

59 — GAP

INTERIOR — 150

SYSTEMS

PROPULSION 152   156

HYDRAULIC

ELECTRICAL 154   158

ENVIRONMENTAL

— 148

1

METHOD AND APPARATUS FOR MAKING A GAP FILLER HAVING A VARIABLE CROSS-SECTION

CROSS-REFERENCE TO RELATED APPLICATION

This application claims the benefit of U.S. Provisional Patent Application No. 63/591,530 filed Oct. 19, 2023, which is incorporated by reference herein.

BACKGROUND INFORMATION

1. Field

The disclosed embodiments generally relate to production of composite laminate structures, and deal more particularly with a method and apparatus for making a composite gap filler having a variable cross-section along its length.

2. Background

Composite laminate structures sometimes have internal voids or gaps that must be filled with material in order to reinforce joints and meet structural performance requirements. For example, composite laminate stiffeners such as stringers may comprise multiple parts joined together in a manner that create gaps along radius corners of the parts. Similar gaps may be present between the stiffener and a structure to which is attached. A continuous gap filler (colloquially referred to as "noodle") is placed in the gaps and becomes integrated into the stiffener when it is cured. The gap fillers can be formed from any of various composite materials such as pre-preg or dry fiber, and should have cross-sectional shapes and dimensions closely matching those of the gaps.

A problem exists in some applications where the cross-section of the gap is not constant along its length, but rather varies in different sections. In order to fill a gap with changing geometry, a filler having a generic geometry is used that best fits most sections of the gap along its length, leaving other sections either under filled or over filled. It may be possible to partially address this problem by using different dies to extrude different sections the filler, but this solution is time-consuming, labor-intensive and requires that the filler be extruded in separate sections, resulting in a gap filler that is not homogeneous.

Accordingly, it would be desirable to provide a method and apparatus for producing a continuous, homogeneous, composite gap filler having a cross-section that varies along its length, matching the shape of all sections of the gap.

SUMMARY

The disclosure relates in general to composite structures having parts forming gaps or voids that must be filled to provide a desired level of structural integrity. More specifically, this disclosure provides a method and apparatus for making a homogeneous, composite gap filler having a variable cross-section that closely matches a gap having changing geometry along its length. One of the advantages of the disclosed method and apparatus is that a composite gap filler with a variable cross-section can be produced that is continuous and homogeneous along its length, rather than in sections. Another advantage is that greater structural integrity can be achieved by a composite gap filler that is continuous throughout all sections of the gap. A further advantage is that a composite gap filler with a varying cross-section can be produced quickly and easily without the need for changing multiple dies, thereby reducing labor costs and increasing production throughput. Still another advantage is that the dimensions of a composite gap filler with a variable cross-section can be more closely controlled.

According to one aspect, a method is provided of making a composite gap filler having a varying cross-section. The method comprises drawing a composite preform through a nip in the die, and changing the shape of the nip.

According to still another aspect, a method is provided of making a composite gap filler having a cross-section that varies along its length. The method comprises heating a composite preform to a softening temperature sufficient to allow the composite preform to be reshaped, and drawing the composite preform through a die configured to form the composite preform into a composite gap filler having a desired cross-section. The method also includes changing the cross-section of the composite gap filler as a composite preform is drawn through the die by altering the die.

According to still another aspect, apparatus is provided for making a continuous, composite gap filler formed of a composite material and having a cross-section that varies along its length. The apparatus comprises a die having a nip through which a composite preform may be drawn. The die includes die members that are configured to form the composite preform into a desired cross-sectional shape. Each of the die members has a changeable die face configured to vary the cross-section of the composite gap filler as the composite preform is drawn through the nip.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
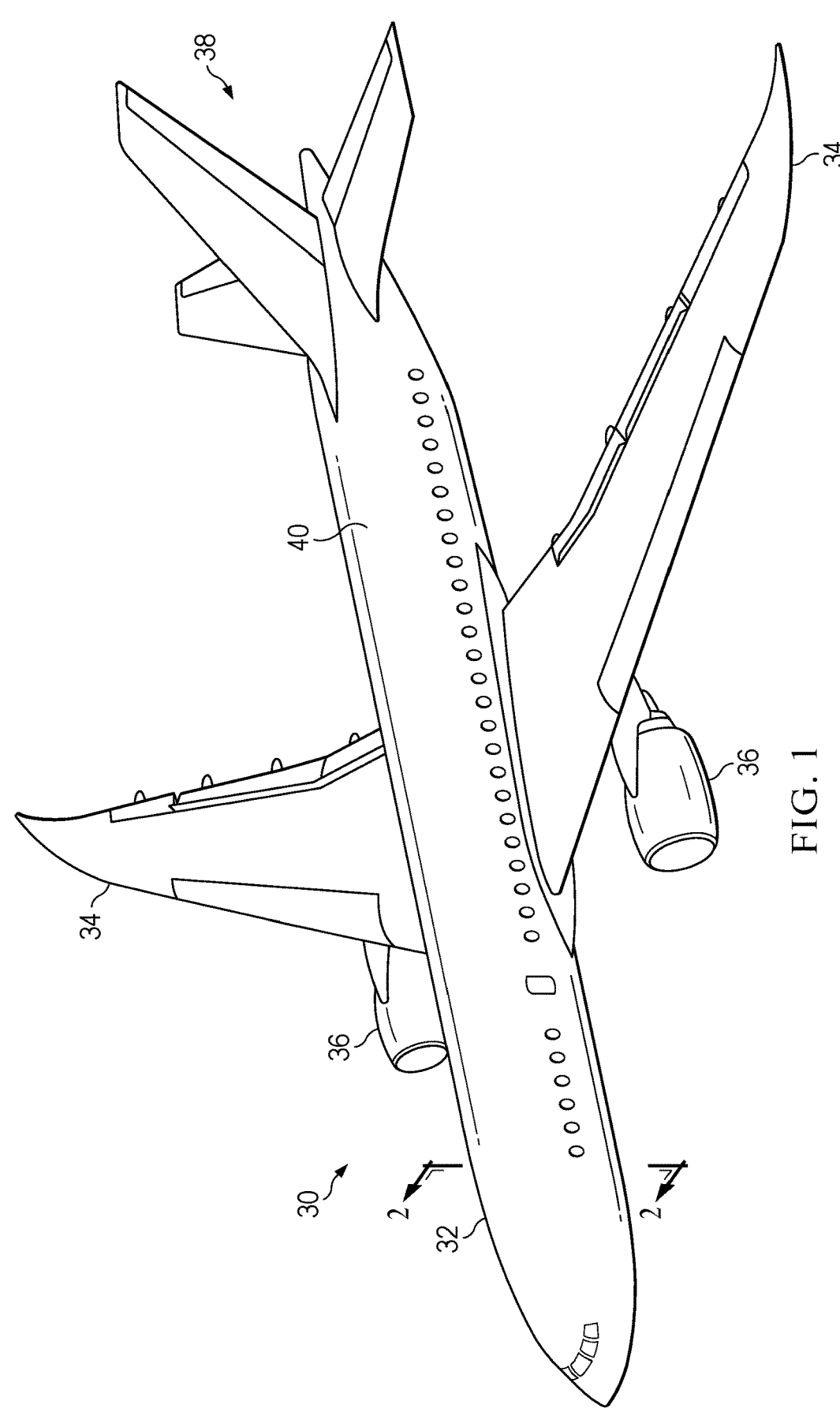
FIG. 1 is an illustration of a perspective view of an airplane.
Figure 2:
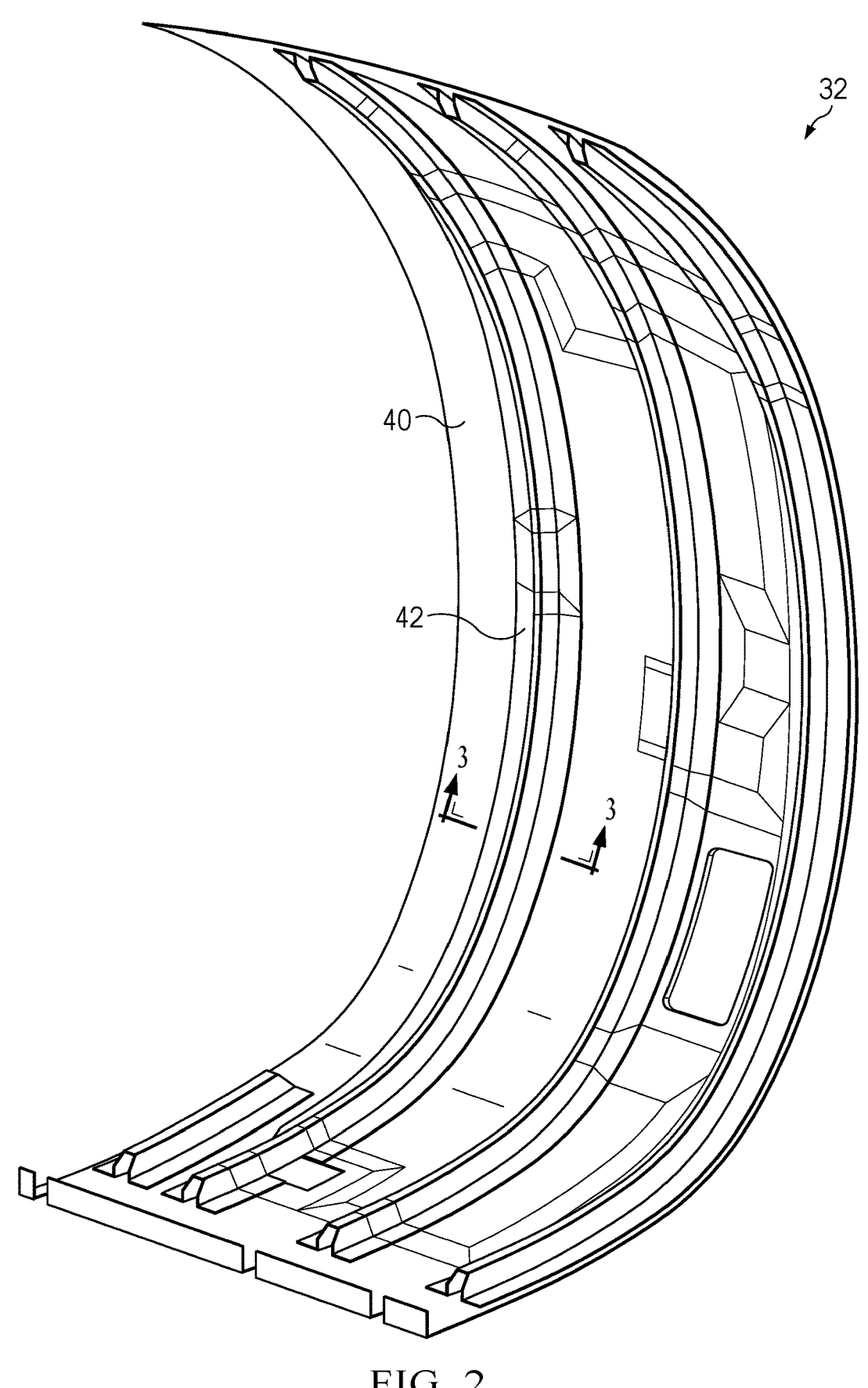
FIG. 2 is an illustration of a sectional view taken along the section line 2-2 in FIG. 1.

Referring first to FIGS. 1 and 2, an airplane 30 comprises a fuselage 32, wings 34, engines 36 and an empennage 38. The airplane 30 as an airframe formed by composite components and structures covered by an skin 40. For example, as shown in FIG. 2, the skin 40 may be stiffened by longitudinally spaced, composite stiffeners 42 that are bonded to or co-cured with the skin 40 to form an integrated structure.

Figure 3:
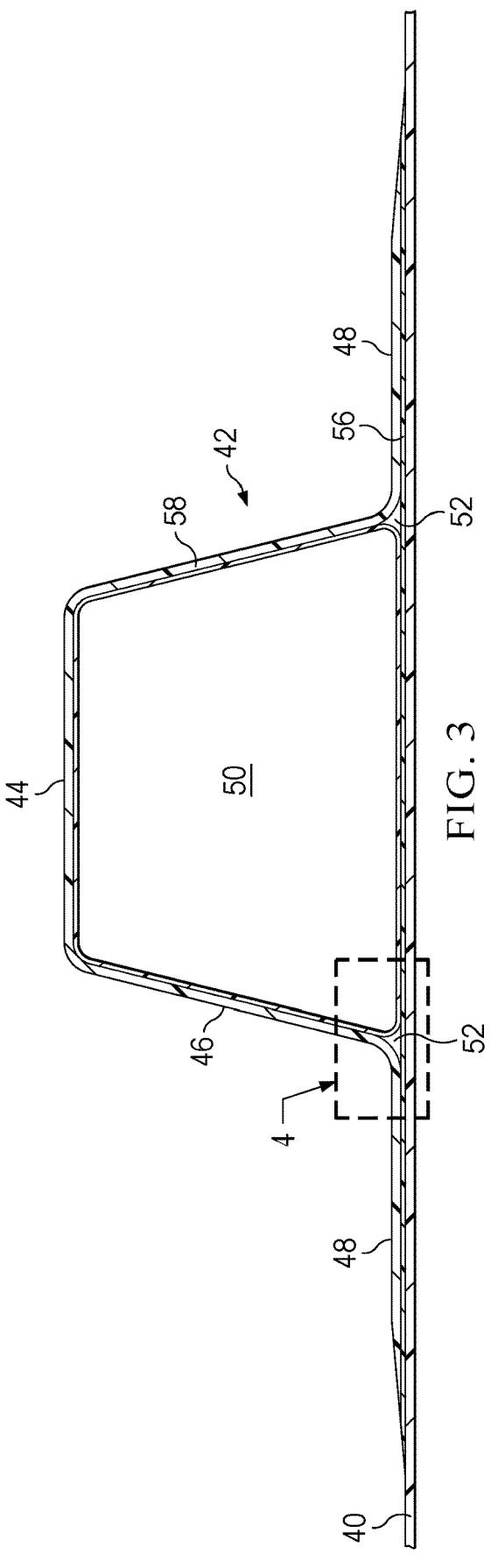
FIG. 3 is an illustration of a sectional view taken along the section line 3-3 in FIG. 2.
Figure 4:
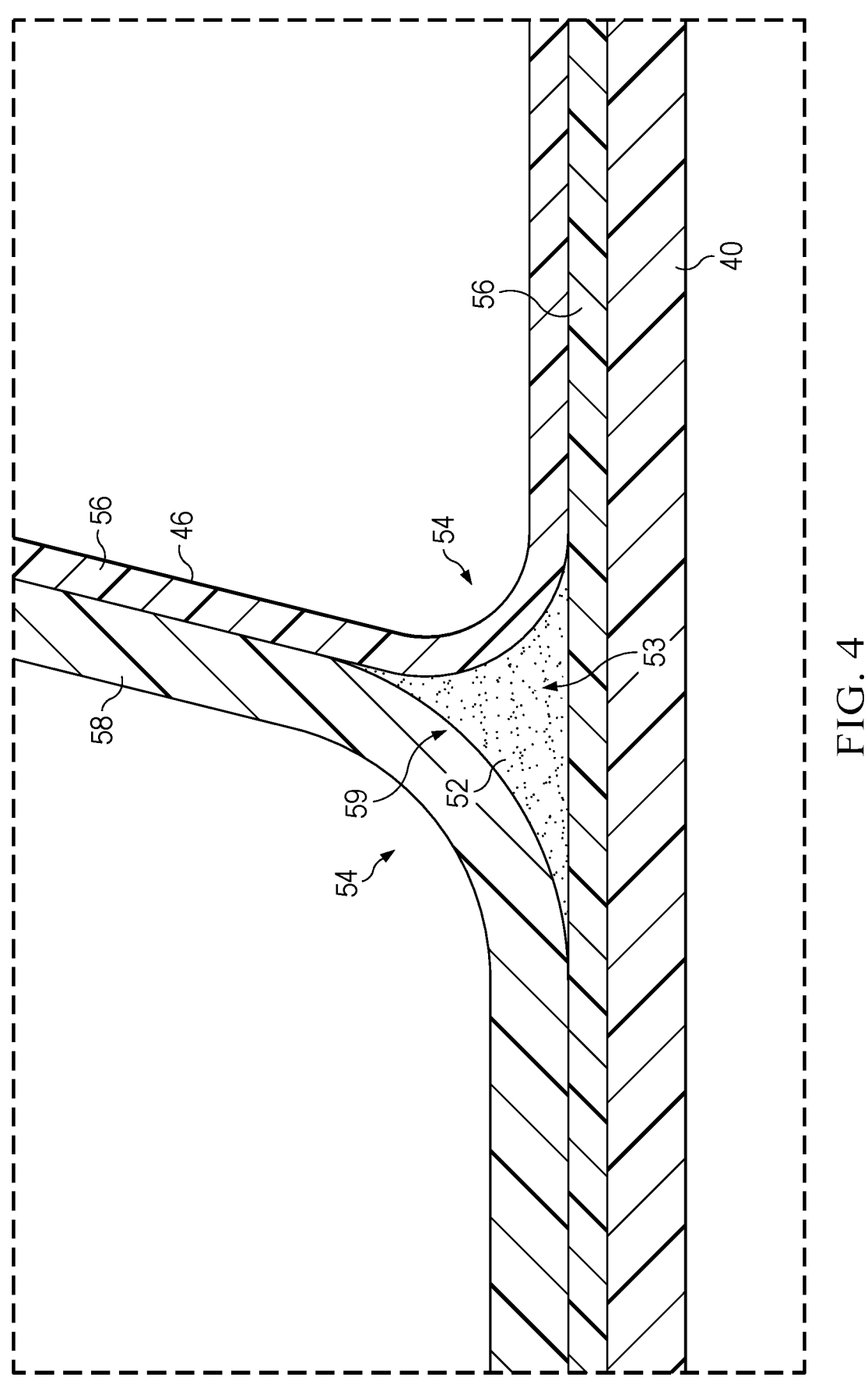
FIG. 4 is an illustration of the area designated as "FIG. 4" in FIG. 3, better showing a composite gap filler.

Referring to FIG. 3, each of the composite stiffeners 42 is a so-called hat stiffener, comprising a flat top 44, inclined sides 46, and flanges 48 that together form a hat-shaped cross-section. The composite stiffener 42 has a base 56, and an inner core 50 covered by an outer wrap 58, each of which may comprise any number of plies of a composite material such as CFRP (carbon fiber reinforced plastic). Both the inner core 50 and the outer wrap 58 have radius sections 54 (see FIG. 4) which intersect along the skin 40 form a void or gap 59 that extends along either a section or the entire length of the composite stiffener 42. In the illustrated example, the gap 59 has a cross-sectional shape 53 that is generally triangular, but in other examples, it may have any cross-sectional size and/or shape. In order to fill the gap 59 and form a reinforced structural joint between the composite stiffener 42 and the skin 40 in the area of the radius section 54, a composite gap filler 52 is placed in the gap 59, typically at the time the composite stiffener 42 is placed on the skin 40. However in other examples, the composite gap filler 52 may be installed at the time the composite stiffener 42 is fabricated, prior to placing the composite stiffener 42 on the skin 40. It should be noted here that while a composite stiffener 42 of the hat type is used as an exemplary, a wide range of other forms of composite stiffeners such as C, I, J, and Z shapes may have parts creating voids that can be filled with the composite gap filler 52. Moreover, the composite gap filler 52 can be used to fill gaps 59 within joints or intersections between other types of structures.

Figure 5:
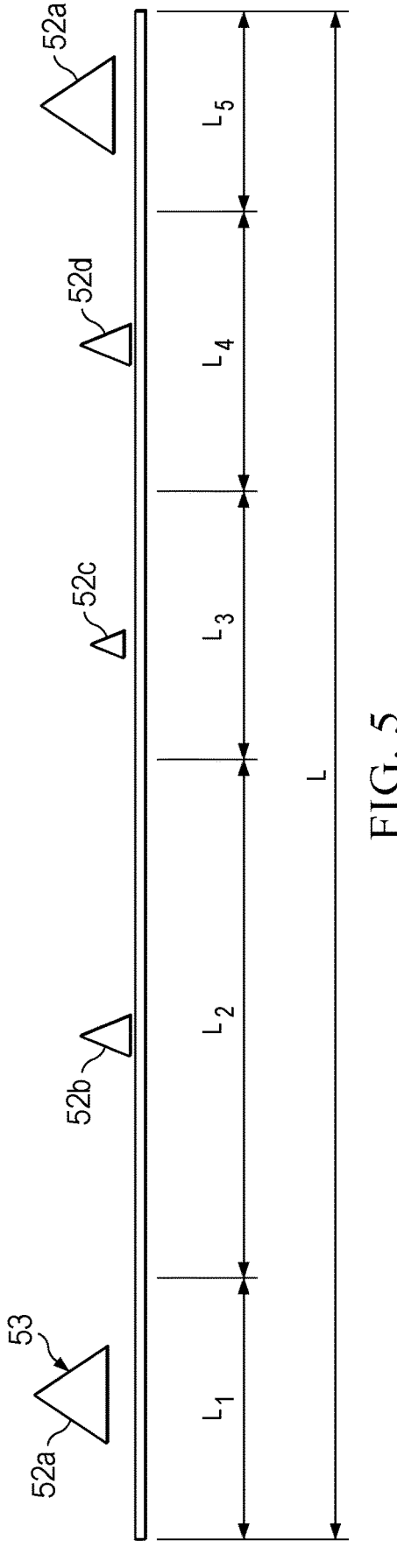
FIG. 5 is an illustration of a diagram showing how the cross-sectional shape of a composite gap filler varies along different sections of its length.
Figure 8:
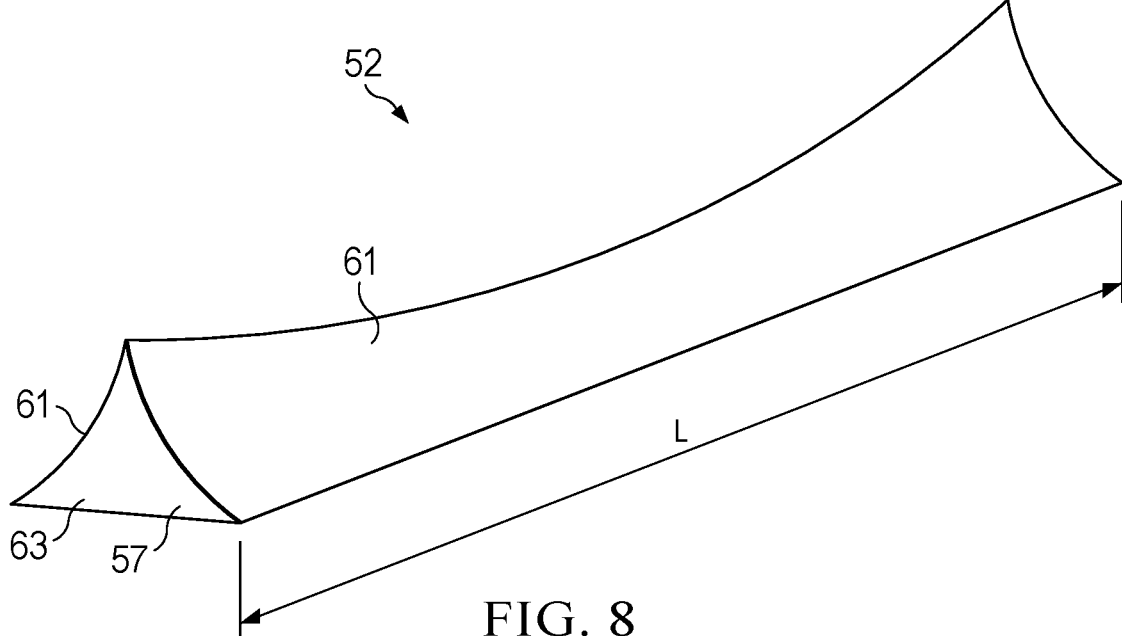
FIG. 8 is an illustration of a perspective view of a composite gap filler having a variable cross-section along its length.

As mentioned earlier, the gap 59 has a cross-sectional shape 53 that may vary either along sections or throughout its entire length L (FIGS. 5 and 8). The present disclosure provides a method and apparatus for producing such a homogeneous, composite gap filler 52 that substantially completely fills the gap 59. As used herein, "homogeneous" means that the composite gap filler 52 is a unitary component formed of a material that is continuous along its length L, free of interruptions or segmentation. FIG. 5 illustrates one example of a composite gap filler 52 having a varying triangular cross-section. As used herein, "variable cross-section" and "varying cross-section" means that the cross-section of the composite gap filler 52 changes in size and/or shape within different sections of the composite gap filler 52, respectively designated in FIG. 5 as $L_1, L_2, L_3, L_4, L_5$ along its length L.

In this example, the cross-sectional size and shape of the composite gap filler 52 is shown as changing abruptly from one section to another, for example from cross-sectional shape 52*a* throughout section $L_1$, to a smaller cross-section shape 52*b* throughout section $L_2$. While this form of variation in cross-section may be suitable for some types of gaps 59 that have corresponding abrupt changes in cross-section, in other applications the transition between one or more of the sections $L_1$-$L_5$ may be gradual. In fact, the cross-section of the composite gap filler 52 may vary smoothly, or at any rate between any of the sections or throughout the entire length L of the composite gap filler 52.

Figure 6:
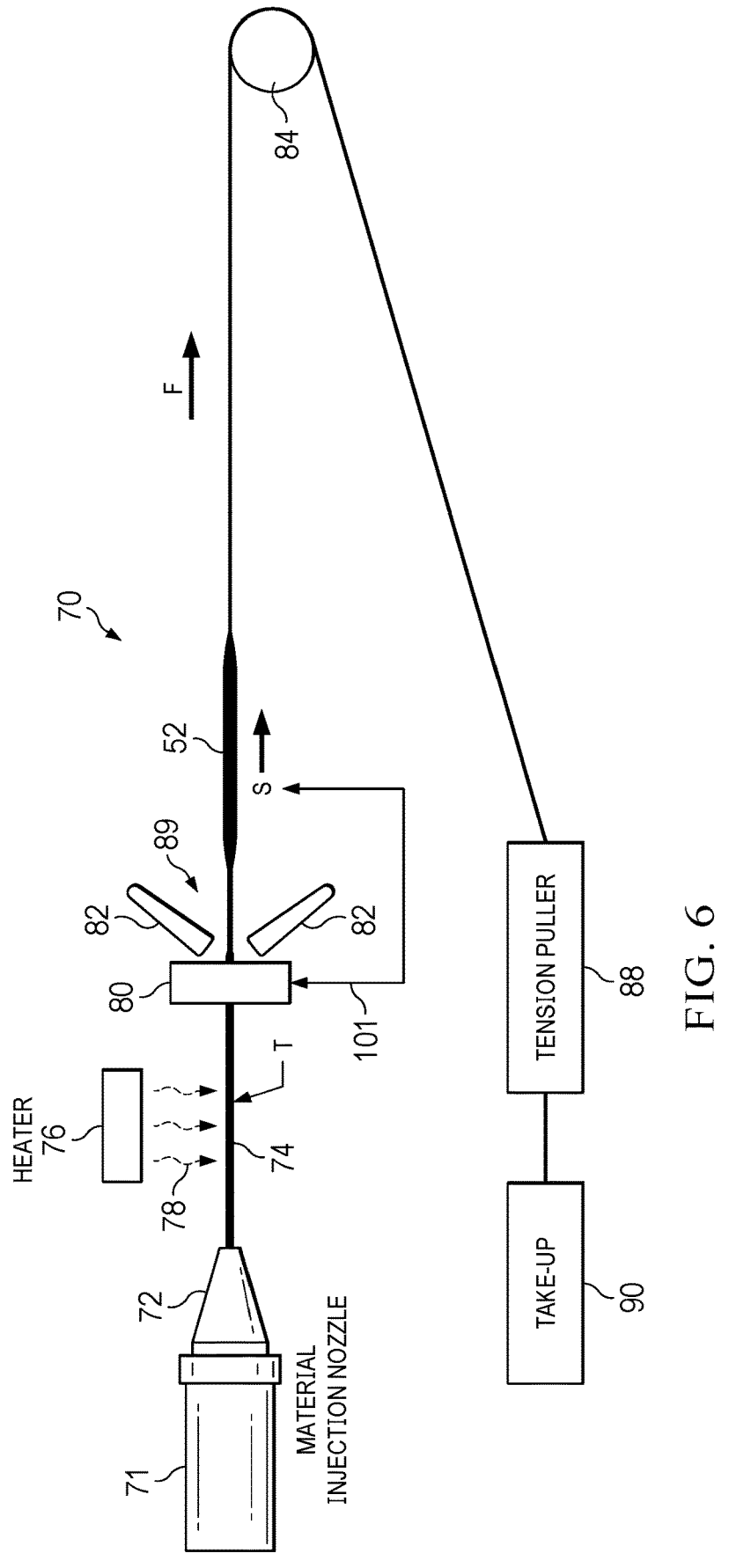
FIG. 6 is an illustration of a diagram of an apparatus for making a homogeneous, composite gap filler having a variable cross-section.

FIG. 6 illustrates one example of apparatus 70 for producing a composite gap filler 52 having a cross-section that varies in one or more sections along its length L, or throughout its length L. A supply 71 of composite material is delivered and extruded through an injection nozzle 72 that forms the composite material into a composite preform 74 having a generalized shape suitable to be further formed into a desired final cross-sectional shape. A heater 76 such as an infrared heater, heats 78 the composite preform 74 to a softening temperature T that reduces the viscosity of the resin to a point allowing the composite preform 74 to be reformed to a desired cross-sectional shape by a die 80. The heated composite preform 74 is drawn through a die 80 by a force F applied to the composite preform 74 by a tension puller 88. As will be described below, the die 80 reforms the composite preform 74 into a composite gap filler 52 having the desired size, shape and areal density, following which a cooler 82 such as cooling air generators, cools 89 the composite gap filler 52, thereby fixing its shape. The composite gap filler 52 is then drawn around one or more guide rollers 84 by the tension puller 88 and fed onto a material take-up 90 such as reel (not shown).

Attention is now directed to FIGS. 7-10 which illustrate additional details of the die 80 and its operation. The die 80 includes a die opening hereinafter referred to as a nip 98 through which the composite preform 74 is extruded as a result of the pulling force F (FIG. 6) applied to the composite preform 74 by the tension puller 88. Extrusion through the nip 98 reforms the cross-sectional shape of the composite preform 74 into that of the composite gap filler 52 shown in FIG. 8. In this example, the composite gap filler 52 has a flat base or bottom 57, arcuate sides 61, and a cross-section 63 that varies in size and/or shape along its length L. The illustrated die 80 comprises three die members 92, 94, 96, however in other examples as few as two or more than three die members may be used, depending upon the desired cross sectional shape of the composite gap filler 52. The die members 92, 94, 96 are respectively mounted for full or partial rotation, or tilting about an axis 100*a*, 100*b*, 100*c*, and may have any shape suitable for the application, including but not limited to a round or oval shape (not shown). Although not shown in the Figures, any suitable motors and motor controls can be used to rotate or partially rotate the die members 92, 94, 96. As will be discussed below, the shape 81 of the nip 98 formed by the die members 92, 94, 96 and be changed in real-time to form a composite gap filler 52 having a varying cross-section along its length L. Rotation of the die members 92, 94, 96 changes the shape 81 of the nip 98 as the composite preform 74 is being drawn through the nip 98. Changing the shape 81 of the nip 98 causes the cross-section of the composite gap filler 52 to likewise change.

Die members 92, 94, 96 have corresponding die faces 95, 97, 99 that contact each other and form sides of the nip 98, and together define the shape 81 of the nip 98 in cross section. The die faces 95, 97, 99 contact 105 each other and enclose the nip 98 on all sides. One or more of the die faces 95, 97, 99 has a cross-sectional profile that changes around at least a section of the circumference of the corresponding die member 92, 94, 96. For example in the illustrated embodiment, the die face 95a within one section of the circumference of die 92 has a cross-sectional profile that is different from die face 95. Likewise, the profile of die face 97a of die member 94 is different than die face 97. In other words, the profile of each of the die faces 95, 97, 99 may vary around the circumference of the die members 92, 94, 96.

Thus, depending upon the rotation position of the die members 92, 94, 96, different profiles of the die faces 95, 97, 99 can be presented to change the size and/or shape of the nip 98. The ability to change the nip 98 in this manner through rotation of the die members 92, 94, 96 allows extrusion of a composite gap filler 52 that can have any cross-section at any point or section along its length. The nip 98 can be dynamically changed in this manner as the composite gap filler 52 is being extruded through the die 80, either in a stepwise manner, or continuously. The rotation of die members 92, 94, 96 are synchronized such that they remain in contact 105 along their edges as the size and/or shape of the nip 98 is changed. Similarly, as will be discussed later, rotation of the die members 92, 94, 96 is synchronized 101 with the speed S at which the composite preform 74 is drawn through the die 80.

Figure 9:
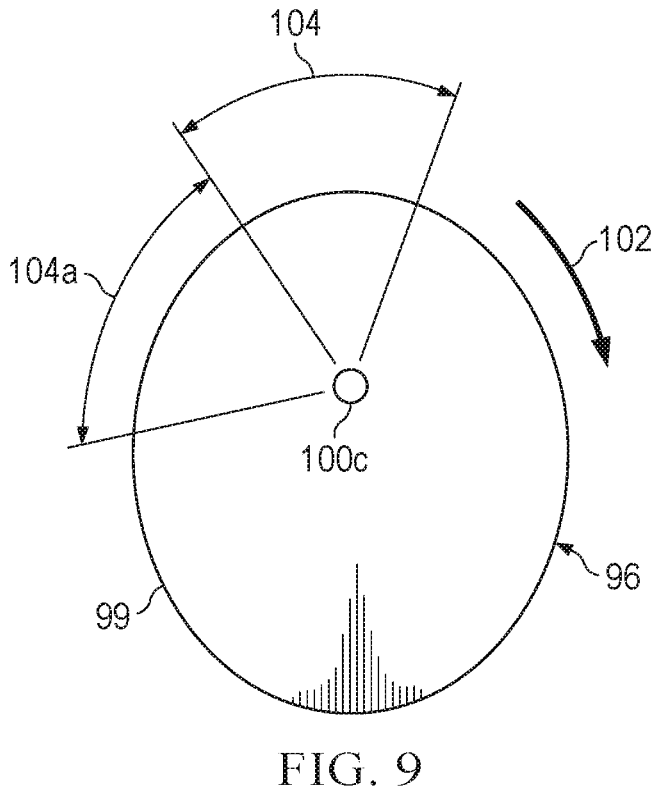
FIG. 9 is an illustration of a side view of one of the dies forming part of the die assembly of FIG. 7.
Figure 10:
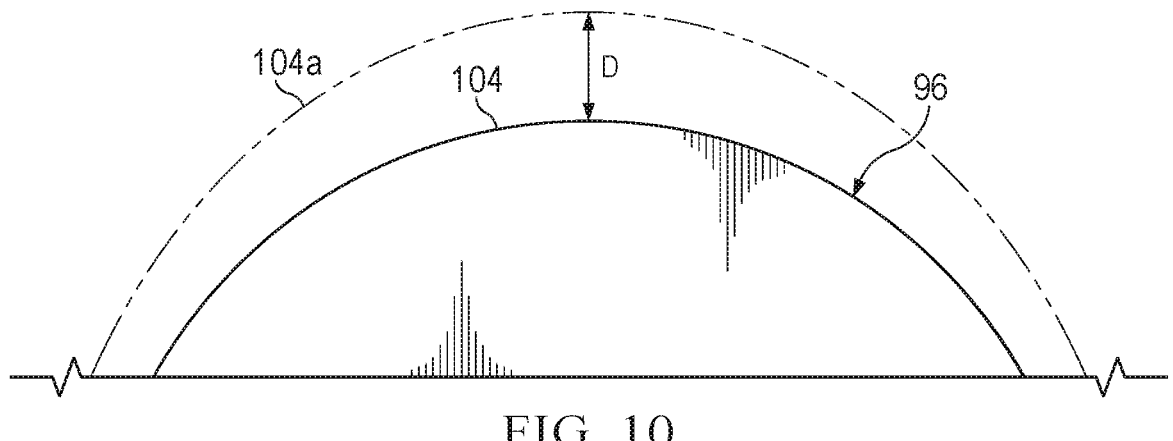
FIG. 10 is an illustration of a diagram showing how rotation of the die shown in FIG. 9 changes the die face in a manner that alters the size of the nip.

FIGS. 9 and 10 illustrate how rotation of die member 96 results in presentation of different profiles within sections 104, 104a of a die face 99 to change the nip 98. In this example, die member 96 has an oval shaped outer circumference and is eccentrically mounted for rotation about an axis 100c. Rotation 102 of the die member 96 correspondingly rotates the die face 99, changing the section (profile) presented to the nip 98, from section 104 to section 104a. Due to the eccentric shape of the die member 96 a difference D exists in the distance between the die face 99 and the nip 98. Thus, when the die member 96 is rotated as shown in FIG. 9 from section 104 to section 104a, the size of the nip 98 likewise increases the width of the bottom 52c of the composite gap filler 52.

Figure 11:
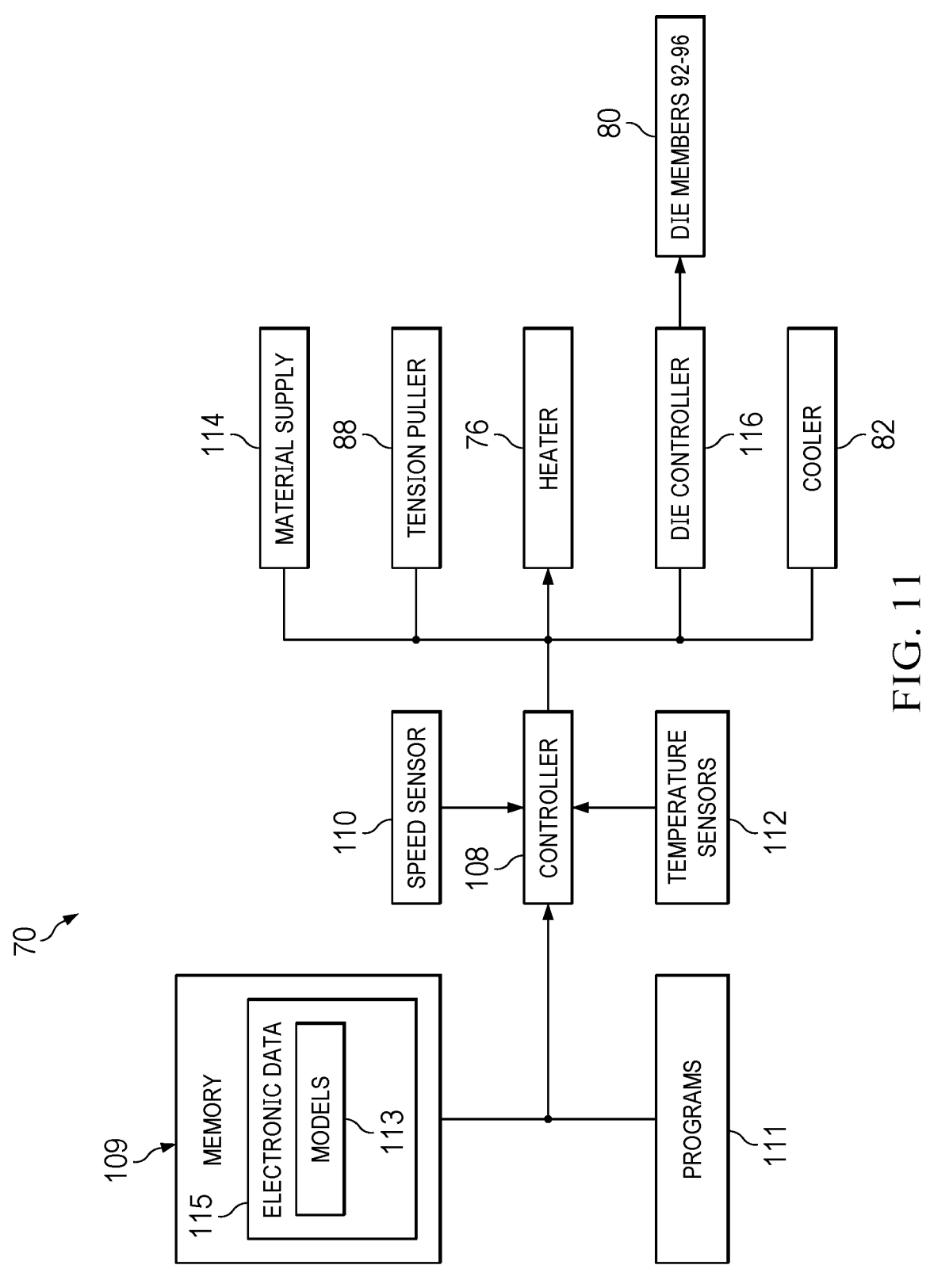
FIG. 11 is an illustration of a block diagram showing the functional components of the apparatus of FIG. 6.

Attention is now directed to FIG. 11 which broadly illustrates functional components of an apparatus 70 for making a homogeneous, composite gap filler 52 having a variable cross-section along its length L. A die 80 having multiple die members 92, 94, 96 is controlled by die controller 116 that is configured to control rotation of each of the die members 92, 94, 96. The die controller 116 may include one or more motors and associated motor controllers (not shown) that control rotation of or otherwise displace the die members 92, 94, 96 in a manner that changes the size and/or shape of a nip 98. In other words, the die controller 116 synchronously rotates the die members 92, 94, 96, thereby changing the profiles of the die faces 95, 97, 99 that define the nip 98. Thus, changing the shape of the nip 98 is performed in real-time. The apparatus 70 further includes a material supply 114, tension puller 88, a heater 76 and a cooler 82 all of which are operated by a controller 108 that may be any suitable computer or one or more processors. A speed sensor 110 is coupled with and provides a speed signal to the controller 108 indicating the speed at which the composite preform 74 is being extruded through the die 80. One or more temperature sensors 112 may be used to provide temperature signals to the controller 108 indicating the temperature of the composite preform 74 before it is extruded through the die 80, and/or the temperature of the composite gap filler 52 after being extruded by the die 80. The apparatus 70 also includes at least one memory 109 storing programs for operating the controller 108 as well as programs and/or electronic data 115 representing a model 113 of the composite gap filler 52.

Figure 7:
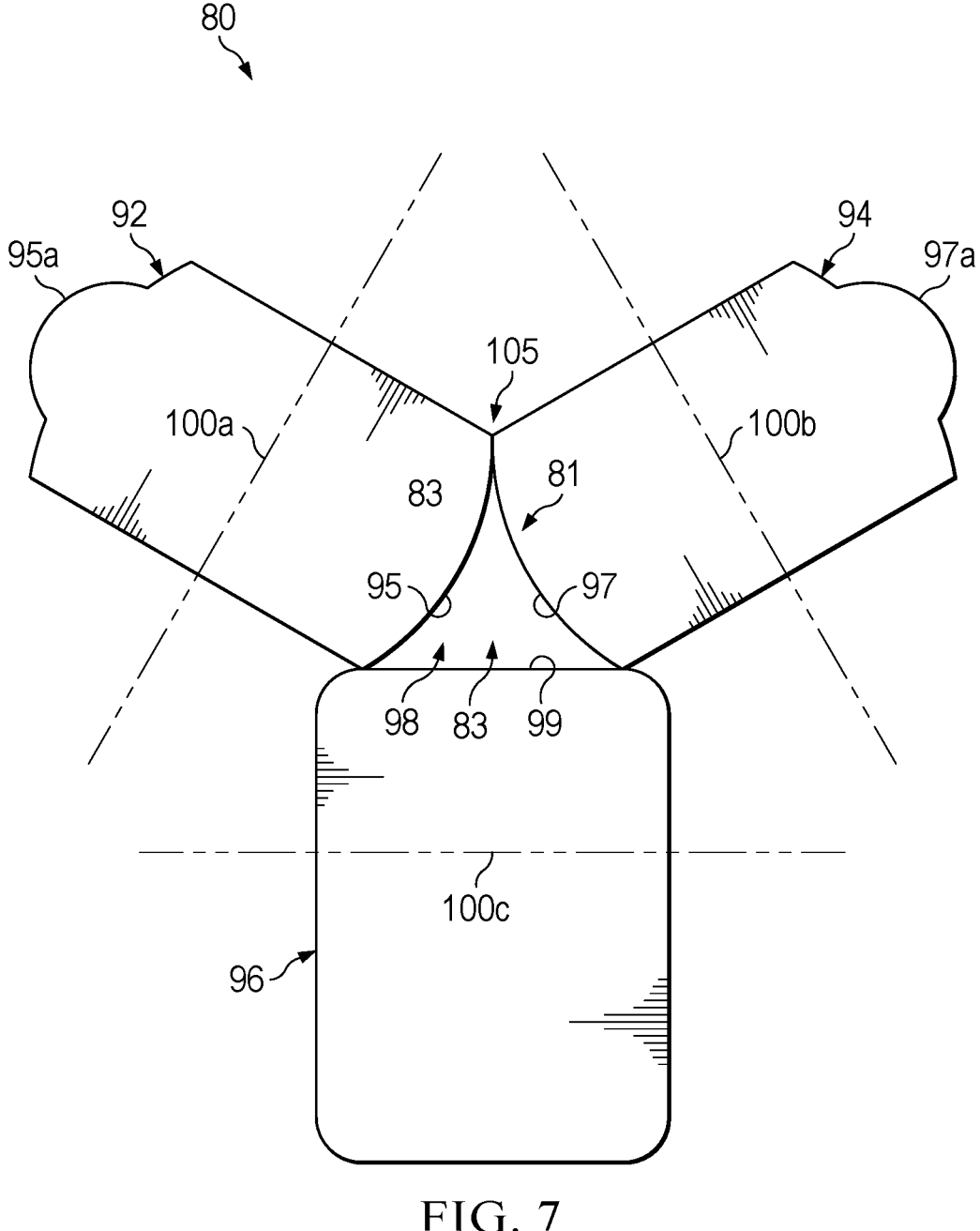
FIG. 7 is an illustration of a simplified end view of a die forming part of the apparatus shown in FIG. 6.

Referring now concurrently to FIGS. 6, 7 and 11, in use, suitable composite material such as pre-preg, dry fiber or other material suitable for the application. is fed from a supply 71 of composite material through an injection nozzle 72, producing a composite preform 74 that is heated 78 to its softening temperature, i.e. forming temperature and drawn through a die 80 by a tension puller 88. As previously explained, the die 80 comprises multiple die members 92, 94, 96 with changeable die faces 95, 97, 99 that form a nip 98 through which the composite preform 74 can be extruded. Based on stored programs 111 and/or models 113, the die controller 116 intermittently or continuously configures the die 80 to extrude a homogeneous, composite gap filler 52 with a varying cross-section along its length L. Effectively, under computer control, the die controller 116 automatically re-configures the die 80 by rotating or tilting 102 the die members 92, 94, 96 about an axis 100c to present sections of the die faces 95, 97, 99 creating a nip 98 of the desired size and/or shape. Depending on the type of composite gap filler 52 being produced, one or more of the die members 92, 94, 96 may need to be rotated or tilted 102 to achieve a particular configuration of the nip 98. As the composite preform 74 is being extruded through the die 80, the speed S at which the composite preform 74 is being drawn through the die 80 by the tension puller 88 is adjusted as necessary so as to synchronize 101 this speed with the rate at which the nip 98 is being re-configured by the die controller 116.

Figure 12:
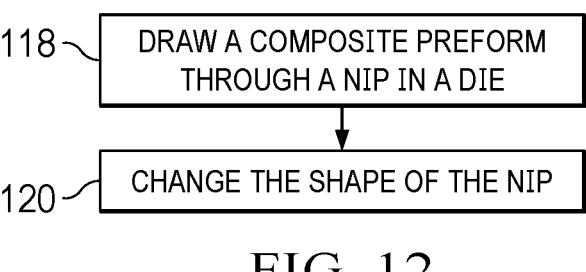
FIG. 12 is an illustration of a flow diagram of a method of making a continuous, composite gap filler having a varying cross-section.

FIG. 12 broadly illustrates the steps of a method of making a composite gap filler 52 having a varying cross-section. Beginning at 118, a composite preform 74 is drawn through a nip 98 in a die 80. At 120, the shape of the nip 98 is changed.

Figure 13:
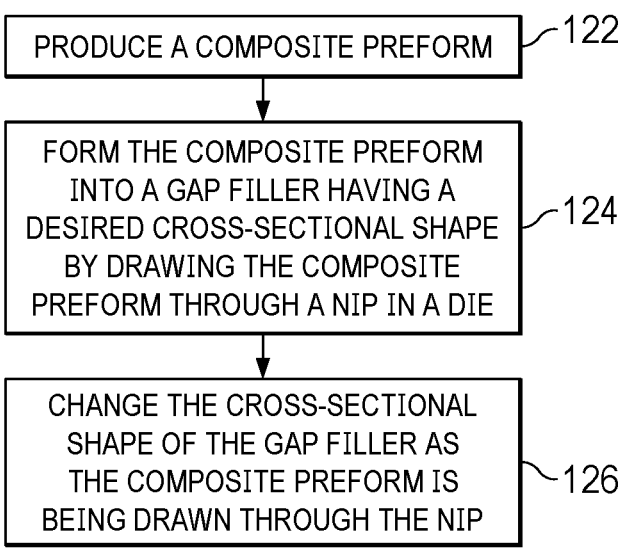
FIG. 13 is a flow diagram of a method of making a composite gap filler having a cross-section that varies along its length.

FIG. 13 broadly illustrates the steps of a method of making a composite gap filler 52 having a cross-section that varies along its length L. At 122, a composite preform 74 is produced, following which, at 124, the composite preform 74 is formed into a gap filler 52 having a desired cross-sectional shape by drawing the composite preform 74 through a nip in a die 80. At 126, the cross-sectional shape of the gap filler 52 is changed as the composite preform 74 is being drawn through the nip 98.

Figure 14:
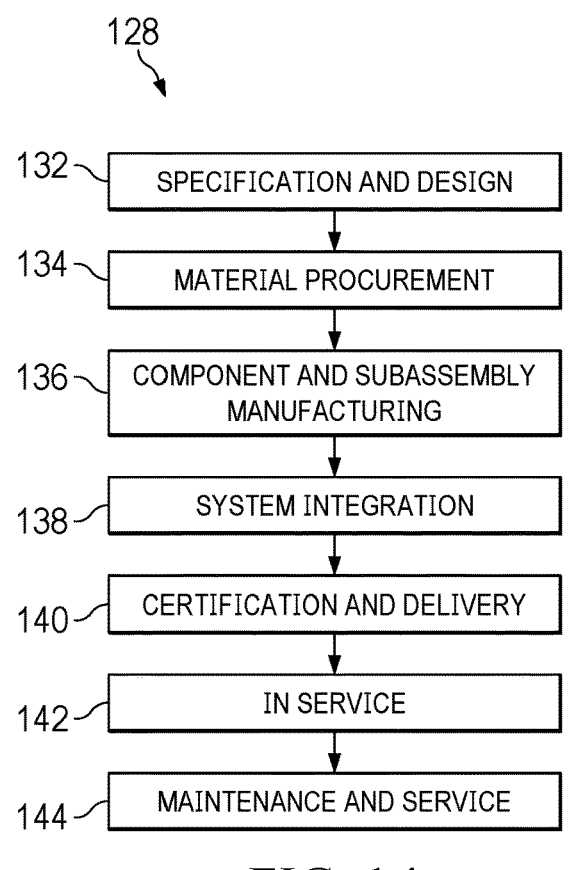
FIG. 14 is an illustration of a flow diagram of aircraft production and service methodology.
Figure 15:
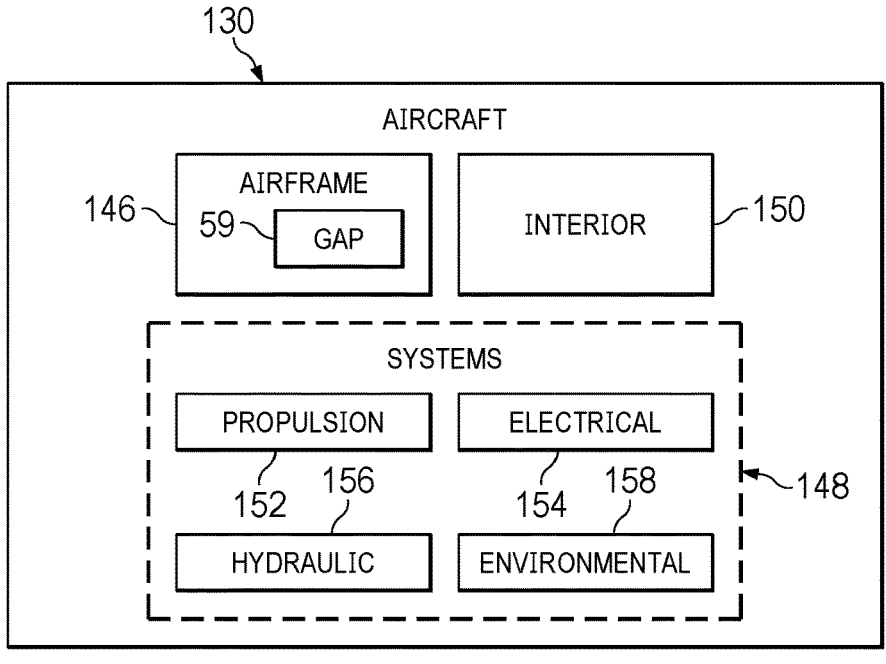
FIG. 15 is an illustration of a block diagram of an aircraft.

Examples of the disclosure may find use in a variety of potential applications, particularly in the transportation industry, including for example, aerospace, marine, automotive applications and other application where composite parts had internal gaps or voids that must be filled. Thus, referring now to FIGS. 14 and 15, examples of the disclosure may be used in the context of an aircraft manufacturing and service method 128 as shown in FIG. 14 and an aircraft 130 as shown in FIG. 15. Aircraft applications of the disclosed examples may include a variety of composite structures forming part of an airframe 146 where the structures are formed from parts that have internal voids or gaps 59. During pre-production, the service method 128 may include specification and design 132 of the aircraft 130 and material procurement 134. During production, component and subassembly manufacturing 136 and system integration 138 of the aircraft 130 takes place. Thereafter, the aircraft 130 may go through certification and delivery 140 in order to be placed in service 142. While in service by a customer, the aircraft 130 is scheduled for routine maintenance and service 144, which may also include modification, reconfiguration, refurbishment, and so on.

Each of the processes of service method 128 may be performed or carried out by a system integrator, a third party, and/or an operator (e.g., a customer). For the purposes of this description, a system integrator may include without any limitation number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 130 produced by service method 128 may include an airframe 146 with a plurality of high-level systems 148 and an interior 150. The airframe 146 may have composite parts joined together in a manner that creates internal voids or gaps denying that must be filled to meet structural performance requirements. Examples of high-level systems 148 include one or more of a propulsion system 152, an electrical system 154, a hydraulic system 156 and an environmental system 158. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 128. For example, components or subassemblies corresponding to component and subassembly manufacturing 136 be fabricated or may manufactured in a manner similar to components or subassemblies produced while the aircraft 130 is in service. Also, one or more apparatus examples, method examples, or a combination thereof may be utilized during the component and subassembly manufacturing 136 and system integration 138, for example, by substantially expediting assembly of or reducing the cost of an aircraft 130. Similarly, one or more of apparatus examples, method examples, or a combination thereof may be utilized while the aircraft 130 is in service, for example and without limitation, to maintenance and service 144.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

The invention claimed is:

1. A method of making a composite gap filler having a varying cross-section, comprising:
   drawing a composite preform through a nip in a die;
   changing a shape of the nip; and
   heating the composite preform to a softening temperature before the composite preform is drawn through the die, wherein changing the shape of the nip includes:
   synchronously rotating a plurality of die members such that they remain in contact along their edges, wherein each of the plurality of die members is eccentrically mounted for rotation about an axis and having a die face defining a section of the nip.

2. The method of claim 1, wherein changing the shape of the nip is performed in real-time while drawing the composite preform through the nip.

3. The method of claim 1, wherein:
   each of the plurality of die members is oval shaped, and
   changing the shape of the nip includes changing the faces of the die members.

4. The method of claim 3, wherein changing the faces of the die members includes at least partially rotating the die members.

5. The method of claim 4, wherein changing the faces of the die members further includes tilting the die members.

6. The method of claim 1, further comprising:
   sensing a speed at which the composite preform is drawn through the nip; and
   synchronizing the speed with changing the shape of the nip.

7. The method of claim 1, further comprising:
   storing electronic data representing a model of a composite gap filler; and
   automatically changing a shape of the nip based on the electronic data.

8. The method of claim 1, wherein changing the shape of the nip is performed as the composite preform is drawn through the nip.

9. A method of making a composite gap filler having a cross-section that varies along its length (L), comprising:
   heating a composite preform to a softening temperature sufficient to allow the composite preform to be shaped;
   drawing the composite preform through a die configured to form the composite preform into a composite gap filler having a desired cross-section;
   changing the cross-section of the composite gap filler as the composite preform is drawn through the die by altering the die,
   wherein changing the cross-section of the composite gap filler includes:
   synchronously rotating a plurality of die members such that they remain in contact along their edges, each of the plurality of die members eccentrically mounted for rotation about an axis and having a die face defining a section of the cross-section of the composite gap filler.

10. The method of claim 9, wherein altering the die includes changing a shape of a nip in the die as the composite preform is drawn through the die.

11. The method of claim 9, wherein changing the cross-section of the composite gap filler is performed automatically under computer control using a set of electronic data defining the cross-section of the composite gap filler.

12. The method of claim 9, further comprising:
   sensing a speed at which the composite preform is drawn through the die, and
   wherein altering a shape of the die is synchronized with the speed at which the composite preform is drawn through the die.

13. The method of claim 9, wherein each of the plurality of die members is oval shaped with die faces forming a section of the composite gap filler.

14. The method of claim 9, wherein altering the die includes changing a shape of a nip of the die in real-time as the preform is drawn through the die.

15. Apparatus for making a continuous, composite gap filler formed of a composite material and having a cross-section that varies along its length (L), comprising:

a die having a nip through which a composite preform may be drawn, the die including a plurality of die members eccentrically mounted for rotation about an axis and configured to form the composite preform into a desired cross-sectional shape, each of the plurality of die members having a changeable die face configured to vary the cross-section of the composite gap filler as the plurality of dies members are synchronously rotated such that they remain in contact along their edges and the composite preform is drawn through the nip; and a heater configured to heat the composite preform to a forming temperature.

16. The apparatus of claim 15, wherein:
each of the plurality of die members is oval shaped.

17. The apparatus of claim 16, further comprising:
a die controller configured to control rotation of each of the die members.

18. The apparatus of claim 17, further comprising:
a speed sensor for sensing a speed (S) at which the composite preform is drawn through the die; and
a controller coupled with the speed sensor and the die controller, and configured to synchronize the speed(S) with operation of the die controller.

19. The apparatus of claim 15, further comprising:
at least one memory;
electronic data stored in the memory representing a model of the composite gap filler; and
a controller coupled with the memory and configured to control the nip based on the model of the composite gap filler.

20. The apparatus of claim 15, wherein the plurality of die members contact each other and form all sides of the nip.

* * * * *